United States Patent [19]

Glover

[11] Patent Number: 5,207,459

[45] Date of Patent: May 4, 1993

[54] TRANSITION COUPLING FOR PIPES

[75] Inventor: Charles J. Glover, Bradford, Pa.

[73] Assignee: Dresser Industries, Inc., Dallas, Tex.

[21] Appl. No.: 728,450

[22] Filed: Jul. 11, 1991

[51] Int. Cl.[5] .................... F16L 55/00; F16L 21/06
[52] U.S. Cl. .................................. 285/23; 285/174;
                                         285/250; 285/323
[58] Field of Search ................ 285/23, 322, 323, 174,
     285/249, 232, 255, 329, 339, 332, 348, 144, 148,
     177, 175, 54, 250, 423, 340, 906; 411/267, 908,
     433, 270; 403/400.1, 368, 179, 309, 370, 374

[56] References Cited

U.S. PATENT DOCUMENTS

| 1,743,315 | 1/1930 | Callender | 285/329 X |
|---|---|---|---|
| 1,973,809 | 9/1934 | Heggem | 285/148 |
| 2,001,946 | 5/1935 | Tschappat | 285/148 |
| 2,163,810 | 6/1939 | Raybould | 285/177 X |
| 2,346,051 | 4/1944 | Seamark | 285/339 |
| 2,585,453 | 12/1952 | Gallagher et al. | 285/910 X |
| 2,755,109 | 7/1956 | Risley . | |
| 2,755,111 | 7/1956 | Newell et al. . | |
| 2,758,852 | 8/1956 | Newell . | |
| 2,761,704 | 9/1956 | Crawford | 285/906 X |
| 2,989,326 | 6/1961 | Seward et al. | 285/339 X |
| 3,186,740 | 6/1965 | Lee | 285/323 X |
| 3,248,135 | 4/1966 | Meripol . | |
| 3,299,958 | 1/1967 | Todd | 285/144 X |
| 3,361,460 | 1/1968 | Jansen | 285/323 X |
| 3,434,744 | 3/1969 | Yoke et al. | 285/52 |
| 3,485,517 | 12/1969 | Howe | 285/54 X |
| 3,498,647 | 3/1970 | Schroder . | |
| 3,920,270 | 11/1975 | Babb, Jr. | 285/177 X |
| 4,062,572 | 12/1977 | Davis . | |
| 4,229,025 | 10/1980 | Volgstadt et al. | 285/323 X |
| 4,309,050 | 1/1982 | Legris | 285/342 X |
| 4,326,587 | 4/1982 | Gauthier et al. | 285/144 X |
| 4,445,714 | 5/1984 | Kisiel | 285/323 |
| 4,466,640 | 8/1984 | Van Houtte | 285/322 X |
| 4,613,160 | 9/1986 | Reneau | 285/323 X |
| 4,712,813 | 12/1987 | Passerell et al. | 285/323 X |
| 4,878,697 | 11/1989 | Henry . | |
| 4,878,698 | 11/1989 | Gilchrist | 285/332 X |
| 4,923,224 | 5/1990 | Makris | 285/177 |
| 5,174,611 | 12/1992 | Byrd et al. | 285/906 X |

FOREIGN PATENT DOCUMENTS

| 1105671 | 4/1961 | Fed. Rep. of Germany | 285/249 |
|---|---|---|---|
| 1382489 | 11/1964 | France | 285/323 |
| 760290 | 10/1956 | United Kingdom | 285/255 |
| 961233 | 10/1962 | United Kingdom . | |

OTHER PUBLICATIONS

Rockwell International Brochure entitled "Clamp and Coupling Products", dated Feb. 1981, pp. 4, 11, 17.

Primary Examiner—Dave W. Arola
Assistant Examiner—Heather Chun

[57] ABSTRACT

A transition coupling for connecting a plastic natural gas supply pipe to a metal service pipe is comprised of substantially plastic components including a tubular non-metallic body and a non-metallic or plastic nut. A plastic nut is threadably connected to the body one at each end thereof for independently compressing seals within the body against the two pipes and separately gripping against the pipes to hold the pipes within the body. At one end of the coupling, a plastic gripper is wedged by the plastic nut to embed in the plastic pipe to anchor the plastic pipe in the coupling. At the other end of the coupling, a metallic gripper is used in conjunction with the other plastic nut to be wedged against and embed in the outside surface of the metal pipe. The metallic gripper is comprised of two segments, the outer surfaces of which are shaped to keep from embedding in the inside surface of the plastic nut and causing the nut to bind on the metallic gripper.

24 Claims, 3 Drawing Sheets

TRANSITION COUPLING FOR PIPES

BACKGROUND OF THE INVENTION

1. Technical Field

This invention relates generally to couplings for connecting pipes together and, in particular, to a transition coupling which is used to join together pipes of different sizes and materials, and which utilizes compression seals between the pipes and the coupling.

2. Background Information

As described in detail in U.S. Pat. No. 4,878,697, it is important that couplings used in natural gas distribution systems using plastic pipe be able to withstand axial stress to avoid losses in sealing capability. Thus, the plastic coupling as described in that patent is concerned with securely gripping the ends of two plastic pipes to hold the pipes together. Grippers within the coupling body grippers are utilized to bite into and grip against the pipes independently of the compression of the seal elements squeezed between the pipes and inside sealing surfaces of the coupling body.

Frequently, in a gas distribution system comprised primarily of plastic gas supply pipe, it becomes necessary to connect the supply pipe to a metal service pipe. In this situation, it is desirable to utilize the same form of coupling employed in connecting together various sections of the supply pipe to also be usable for connecting the plastic supply pipe to the metal service pipe. However, gripping against the outside of a metal pipe which is being connected to a plastic pipe presents a special problem in a substantially plastic coupling.

In the past for metallic couplings, positive gripping of metal pipe is achieved primarily through the use of metallic gripping elements which are wedged to embed into the surface of the metal pipe and hold it against being pulled axially from the coupling and possibly causing a loss in the effectiveness of the seal against the outside of the metal pipe. Such a coupling typically includes a metal body and a metal nut for wedging a metal gripper to bite against the outside of a metal pipe. An example a prior coupling of the foregoing type is shown in U.S. Pat. No. 2,755,109.

Another form of prior art coupling is the transition coupling shown in Rockwell International brochure GCC-800 dated Feb. 1981 at pages 4, 11 and 17. This transition coupling is for use in connecting plastic pipe to metal pipe in a natural gas distribution system. In one important respect, the Rockwell coupling is like the coupling shown in U.S. Pat. No. 2,755,109 and utilizes a metal nut for securing the metal pipe in the coupling.

SUMMARY OF THE INVENTION

The present invention generally contemplates the provision of a substantially non-metallic transition coupling which is particularly suited for use in connecting together metallic and non-metallic pipes to more securely grip and hold the pipes against being easily separated.

More specifically, the present invention aims to accomplish the foregoing by a novel adaptation of a coupling otherwise limited to use in connecting together two separate plastic gas pipes so that the adapted coupling may be used as a transition coupling to connect together a pipe made of a non-metallic or plastic material with a metal pipe. This is accomplished in the present invention by the substitution of some of the components at one end of the prior plastic coupling with unique parts particularly designed to securely grip against and hold the metal pipe. Specifically, this is done without having to replace any of the major non-metallic components of the prior coupling. The result is a coupling which provides a savings in manufacturing costs and is limited in strength against being pulled apart only by the strength of its connection to the plastic pipe.

Invention also resides in the novel configuration of the new parts of the coupling and in the combination of a non-metallic nut with a metallic gripper. In particular, the metallic gripper is of a unique shape which avoids gouging against or binding against the nut during in-service-use but while still achieving the advantage of embedding the metallic gripper in the outside surface of the metal pipe to secure it against being pulled from the body of the coupling. Separate segments of the novel metallic gripper provide for better gripping of the metal pipe with the application of less torque to the nut during tightening of the coupling to the metal pipe. Advantageously, the unique shape of the inside surface of each of the gripper segments serves to bite securely into the surface of the metal pipe while also insuring against the segments becoming cocked to bind against the inside surface of the nut.

Of additional advantage is that the unique construction of the coupling of the present invention enables it to be disconnected from the metal pipe and reused for connection to a different metal pipe without having to replace any of the original components of the coupling used in connecting to either of the metal pipes. Thus, for example, a plastic supply pipe may be switched from connection to the metal service pipe of any one of a number of different service units.

The foregoing and other advantages of the present invention will become more apparent from the following description of the preferred embodiment when taken in conjunction with the accompanying drawings.

BEST MODE FOR CARRYING OUT THE INVENTION

Figure 1:
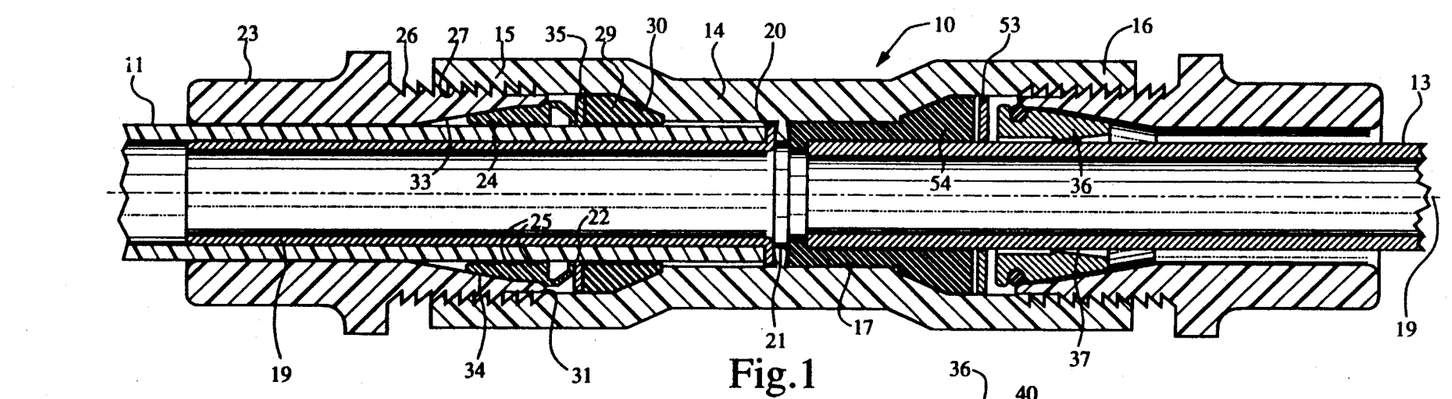
FIG. 1 is a cross-sectional view of a transition joint embodying the novel features of the present invention and showing the coupling installed to connect metal and plastic natural gas pipes together.

As shown in the drawings for purposes of illustration, the present invention is embodied in a transition coupling 10 particularly adapted for use in connecting a non-metallic or plastic supply pipe 1 together with a metal service pipe 13 such as may be used in a natural gas distribution system. Herein, the transition coupling is substantially like the coupling disclosed in U.S. Pat. No. 4,878,697 except that certain components of that prior coupling have been removed and replaced with other parts thereby enabling one end of the coupling to be securely connected to the metallic pipe 13. More particularly, as shown in FIG. 1, the coupling comprises a tubular body 14 having opposite end portions 15 and 16 adapted for connection to the non-metallic and metallic pipes 11 and 13, respectively. Extending between the opposite ends 15 and 16 of the body is a flow passage 17 extending along a central axis 19.

For connecting the end 15 of the coupling body 14 to the plastic pipe 11, a tubular metal sleeve 19 is inserted into the end of the plastic pipe. The sleeve includes a radially outwardly extending flange 20 which serves as a stop locating the sleeve within the end of the plastic pipe. When the pipe and sleeve are inserted into the body 14 of the coupling, the exposed end of the flange 20 abuts a radially inwardly extending shoulder 21. Herein, the shoulder is integrally formed with the coupling body and serves as a stop to locate the end of the plastic pipe 11 within the end portion 15. To lock the plastic pipe within the coupling body, a plastic annular nut 23 is tightened within the end portion 15 of the body wedging a plastic gripper 24 radially inward to bite into the outer surface of the pipe 11. The inner surface of the gripper is provided with a series of annular teeth 25 particularly slanted to resist pulling the plastic pipe 11 out of the coupling body 14 once the gripper is seated. Mating threaded surfaces 26 and 27 on the outside of the nut and inside of the end portion 15 of the body are to enable the nut to be threadably tightened onto the body 14.

To prevent the leakage of gas between the inside of the coupling body 14 and the outside of the plastic pipe 11, an elastomeric gasket seal 29 is located between an inner end 22 of the gripper 25 and an annular sealing surface 30 formed in the inside surface of the end portion 15 of the coupling body 14. The seal 29 surrounds the plastic pipe and is compressed against the sealing surface 30 by the action of an inner end 31 of the nut 23 when the latter is tightened on the body 14.

During tightening of the nut 23 on the body 14, a frustoconically shaped inner surface 33 of the nut rides over a similarly shaped outer surface 34 of the plastic gripper 24, wedging the gripper radially inwardly for the plastic teeth 25 to bite into the outer surface of the plastic pipe 11. As the inner end 31 of the nut slides axially past the inner end 22 of the gripper, it engages an annular compression member 35 in the form of a spring washer and compresses the seal 29 against the sealing surface 30. In this way, the plastic pipe 11 is secured and sealed within the end portion 15 of the plastic coupling body 14.

As described thus far, the end portion 15 of the coupling 10 of the present invention is essentially the same as the coupling disclosed in the aforementioned U.S. Pat. No. 4,878,697 in which both ends of the coupling are identical in configuration. While the plastic coupling disclosed in that patent is particularly useful in joining together the ends of plastic pipes, it is desirable that such a coupling also be useful in connecting the plastic supply pipe of a natural gas distribution gas system to metal service pipe.

Figure 3:
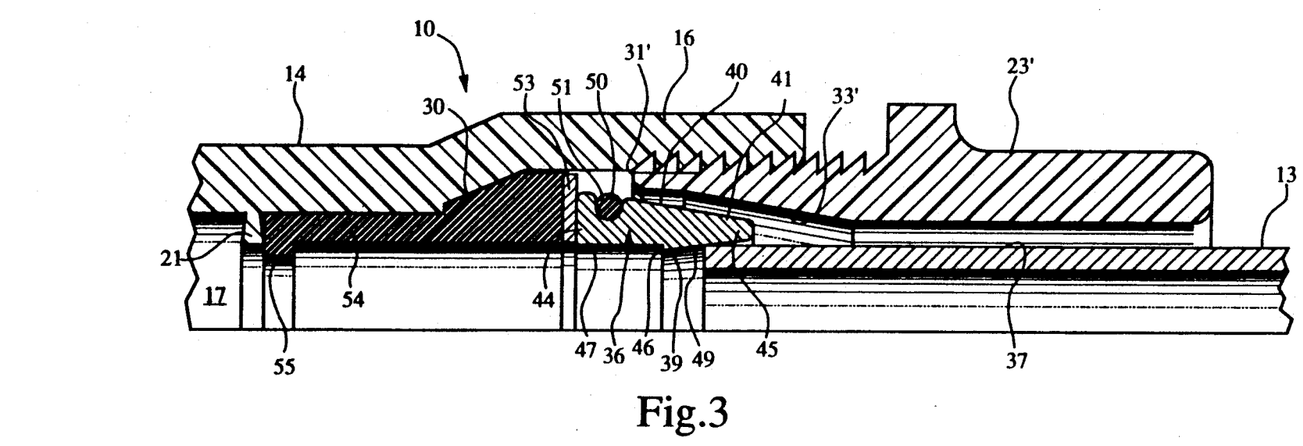
FIG. 3 is an enlarged fragmentary cross-sectional view of the one end of the coupling of the present invention showing the position of parts of the coupling as a metal pipe is initially inserted into the coupling and before being tightened down to seal against the outside of the pipe.
Figure 4:
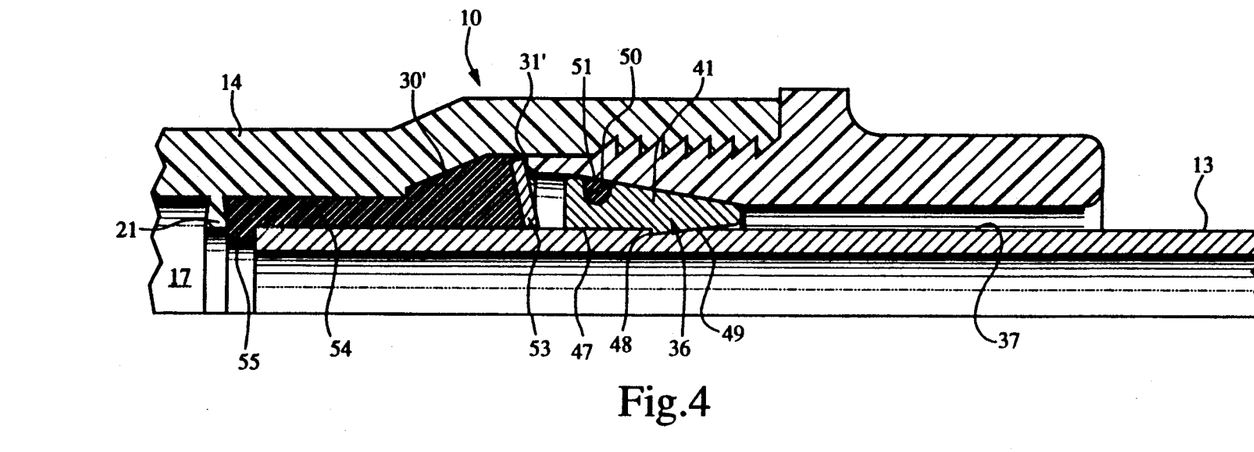
FIG. 4 is an enlarged fragmentary cross-sectional view similar to FIG. 3, but showing parts of the coupling of the present invention in moved positions to seal against the outside of the metal pipe.

In accordance with the primary aim of the present invention, the end portion 16 of the coupling 10 is uniquely adapted to secure the coupling to the metal pipe 13 through the use of a novel gripper 36. For this purpose, the gripper 36 includes a metallic inner biting surface 39 (see FIGS. 3 and 4) and an outer surface 40 which is of a novel configuration to avoid binding with a non-metallic nut 23' during tightening, and thus keep from introducing unnecessary torque between the gripper and nut. As a result, the torque required for axial movement of the nut into the coupling is converted into compressive sealing and radial movement of the gripper against the outer surface 37 of the metal pipe without the introduction of unnecessary torque between the gripper and the nut. Thus, by virtue of this arrangement, consistency in the application of torque is achieved in obtaining a reliable compression seal against and secure gripping of the metal pipe 13 in a substantially non-metallic transition coupling.

In the present instance, the end portion 16 of the coupling body 14 is identical in configuration to the opposite end 15. Similarly, the nut 23' which is threaded into the end portion 16 of the body is identical to the nut 23 which is threaded into the opposite end 15. Accordingly, the same reference numbers have been used to identify corresponding elements of the nut 23' and body end portion 16 as are used in FIG. 1 on corresponding elements of the nut 23 and body end portion 15. Where the parts of the coupling 10 for connecting to the metal pipe 13 are identified by reference numbers different from those of similarly functioning parts of the coupling which are used to connect to the plastic pipe 11, it will be recognized that those differently identified parts include significant different structural features uniquely adapting the end portion 16 of the coupling for connection to the metal pipe 13.

Figure 2:
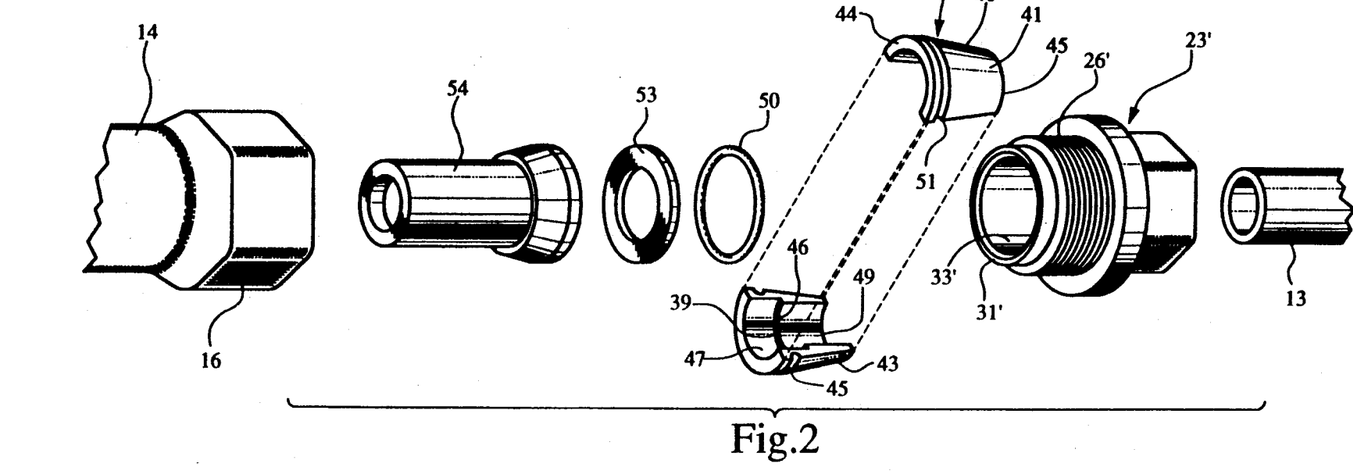
FIG. 2 is a fragmentary exploded isometric view of one end of the transition joint of the present invention.

More specifically, with reference to FIG. 2, the gripper 36 is a sintered metal gripper having a hardness preferably greater than, but at least as great as, the hardness of the metallic pipe 13. In particular, the gripper is comprised of two wedge segments 41 and 43. Each of the segments 41 and 43 are generally wedge shaped in cross section including a thicker inner end 44 and a thinner outer end 45. The outside or wedge surface 40 of each segment extends between the inner and outer ends so that when the two segments are connected together to form a gripper, the outside surfaces 40 of the gripper are generally frustoconical in shape conforming generally to the internal wedge surface 33' of the nut 23'. The inner biting surface 39 of each of the segments also extends between the thicker and thinner ends 44 and 45 and is curved to conform generally with the curvature of the outer surface 37 of the metal pipe 13. For biting into the outer surface of the metal pipe, an arcuate ridge 46 is located between the thicker and thinner ends of each segment. Formed within the inner surface of each segment between the ridge and the thicker end is an arcuate recess 47, and extending in the opposite direction from the ridge is a beveled surface 49. Specifically, the beveled surface extends in a radially outward direction upon progressing axially along the nut from the ridge to the thinner end of each segment.

For biting into the outer surface 37 of the metal pipe 13, the ridge 46 extends in a circumferential direction relative to the central axis 19 of both the coupling 10 and pipe 13 and projects radially inward to form an innermost edge 48. Preferably, the radius of curvature of the edge 48 is not greater than the radius of curvature of the outside surface of the metal pipe 13. As a result, when the nut 23' is initially tightened onto the gripper segments, opposite corners 52 (see FIG. 6) of the edges 48 initially bite into the outer surface of the metal pipe 13 and, in effect, lock the gripper against being pushed axially relative to the pipe by the nut 23'. Accordingly, the torque utilized in tightening the nut is directed to driving the gripper radially inward rather than causing the gripper to gouge in an axial direction along the pipe. To ensure that the innermost edge 47 embeds within the metal pipe as deeply as possible, the bottom wall of the recess 47 has a radius of curvature which is greater than the radius of curvature of the metal pipe 13.

To hold the wedge segments 41 and 43 together within the loosely assembled coupling 10 before the metal pipe 13 is inserted into the coupling, a connector ring 50 encircles the segments at the thicker ends thereof and is seated within a circumferentially extending groove 51. Herein, the connector 50 is formed of an elastomeric material to yieldably and resiliently hold the two segments together. Accordingly, as the metallic pipe 13 is inserted into the coupling, the end of the pipe forces the segments away from each other but with the corners 52 of the innermost edges 48 of each segment being held against the outer surface 37 of the metal pipe (see FIG. 6). As a result, as the nut 23' is threaded into the coupling body 14, the innermost end 31' of the nut slides over the segments 41 and 43 with the inner wedge wall 33' of the nut riding over the outer wedge surfaces 40 of the segments and causing the segments to be moved radially inward with the innermost edge biting into the outer surface of the pipe.

For sealing against the outside of the metal pipe 13, and as the gripper 36 is seated, the inner abutment end 31' of the nut engages a compression member 53 (see FIGS. 3 and 4) pushing the compression member in an axial direction to squeeze an adapter gasket 54 between the outside of the metal pipe 13 and the annular sealing surface 30' formed on the inside surface of the end portion 16 of the coupling body 14. Preferably, the adapter gasket 54 serves essentially the same purpose as the gasket 29 within the end portion 15 with the coupling body. As an added feature, however, the adapter gasket includes an inwardly extending flange 55 which serves as a stop (see FIG. 4) engageable by the end of the metal pipe 13 when initially inserted into the coupling body 14.

Figure 5:
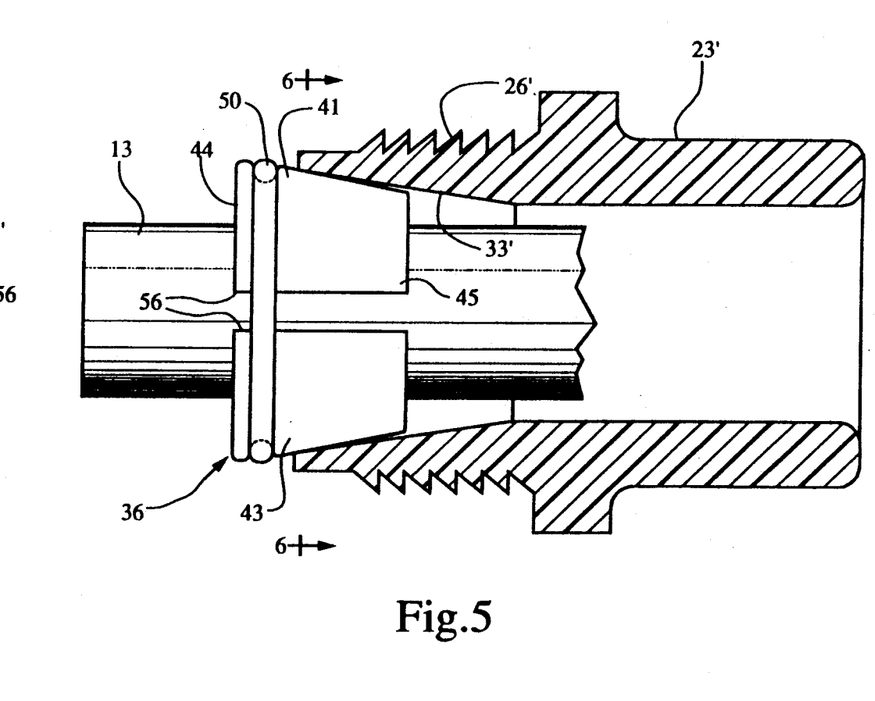
FIG. 5 is an enlarged combined elevational and cross-sectional view showing the coupling with parts removed for clarity of illustration as the coupling is mounted initially on the metal pipe.
Figure 6:
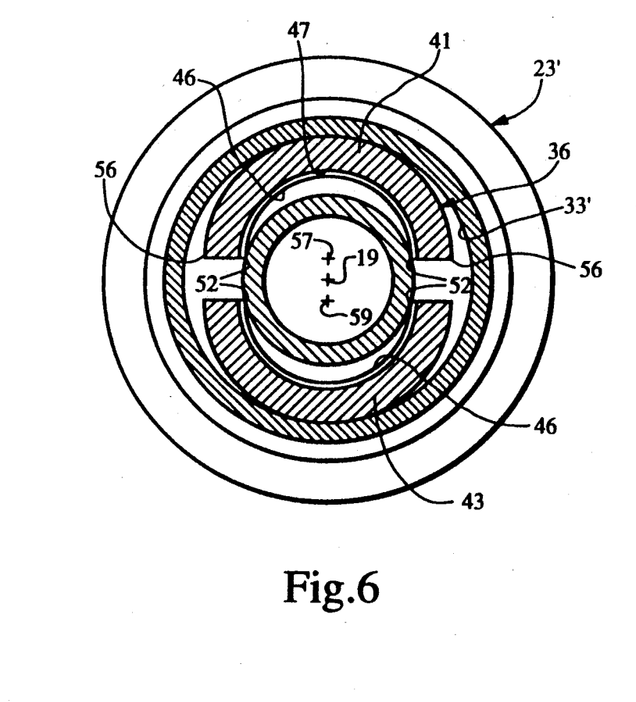
FIG. 6 is a cross-sectional view of parts of the coupling of the present invention taken along line 6-6 of FIG. 5.

To keep the gripper segments 41 and 4 from embedding or gouging into the inner wedge wall 33' of the nut 23' as the segments are wedged radially inwardly, the radially outermost edges 56 (see FIG. 6) of each segment are spaced radially inward of the surface of the wedge wall 33' of the nut 23'. As shown in FIGS. 5 and 6, the edges 56 extend longitudinally between the thicker and thinner ends 44 and 45 of the wedge segments. In the present embodiment of the invention, the spacing of the edges 56 from the adjacent wedge wall 33' is achieved by selection of the relative sizes of the inner surfaces 39 of the segments 41 and 43 and the metal pipe 13 while maintaining geometric similarity between the outer configuration of the segments and the inner wedge wall 33' of the nut 23'. Specifically, the outer wedge surface 40 of each of the segments is curved complementary to the wedge wall 33' with the outer wedge surfaces of the wedge segments being formed at the same preselected acute angle with respect to its axis of rotation in comparison to the acute angle at which the inner wedge wall 33' is formed with respect to its axis of rotation.

With particular reference to FIG. 6, the central axis 19 of the metal pipe 13, the nut 23' and the axis of rotation (viewed as a point) for forming the inner wedge wall 33' of the nut are all coincident. When making initial contact with the inner wedge wall 33', the axes of rotation 57 and 59 of the outer wedge surfaces 40 of the gripper segments 41 and 43, respectively, are spaced diametrically from each other on opposite sides of the central axis 19 of the coupling. As the nut 23' is threaded to move axially inward riding over the outer wedge surfaces 40 of the segments and wedging the segments radially towards each other, the innermost edges 48 embed within the outer surface 37 of the pipe 13. Additionally, a portion of the beveled surface 49 (see FIG. 4) abuts against the outer surface 37 of the metal pipe and the thickness of the segments 41 and 43 is such that the axes of rotation 57 and 59 are always spaced radially outward of the central axis 19 of the coupling even when the wedge segments are fully seated against the outside of the metal pipe and the nut 23' is tightened completely down within the coupling body 14. It will be appreciated that as the nut is tightened down additional outer surface area of the wedge segments is forced against the inner wedge wall 33' of the nut but without the edges 56 ever contacting the inner wedge wall surface 33'. Accordingly, the nut is free to ride in an axial direction over the wedge segments without torque being applied to the wedge segments because the edges 56 avoid gouging into the inner wedge wall 33'.

While the present invention has been described in connection with the wedge segments 41 and 43 having particular size and configuration relationships with respect to the nut 23' and metal pipe 13, it will be appreciated that wedge segments of similar configuration may be utilized while still coming within the scope of the present invention. For example, the axis of rotation which forms the outer surface 40 of segments 41 and 43 may be coincident with the central axis 19 of the pipe but instead of rotation around a circular path, the cross-sectional configuration of the wedge segments taken together may be of an elliptical shape. Additionally, it will appreciated that the sides of the segments 41 and 43 adjacent to the spaces between the two segments may be either rounded or flattened to achieve the structural advantage of the present invention in keeping the segments from gouging into or embedding within the inner wedge wall surface 33' of the nut. Moreover, it will be appreciated that the unique grippers 36 may be used within other connections used on metal pipes. For example, the grippers may be used in end cup connectors, T-connectors, elbows and the like to provide for more secure connections with the application of less torque in tightening the connection to a metal pipe.

Thus, it is seen from the foregoing that the present invention brings to the art a unique substantially non-metallic transition coupling 10 which is particularly adapted for connecting the metal service pipe 13 to a plastic supply pipe 11 in a natural gas system. Advantageously, this is achieved in the exemplary embodiment through the use of the metallic gripper 36 which is comprised of the uniquely shaped segments 41 and 43 which enable the use of the plastic nut 23' for tightening the gripper segments 41 and 43 to embed within the outside surface of the metal pipe and hold the metal pipe securely within the coupling and against separation from the plastic pipe 11.

I claim:

1. In a coupling having a tubular body with opposite end portions and a flow passage extending therebetween along a central axis of said body with one of said end portions being adapted for gripping connection to and independent compressive sealing against the outside of a non-metallic pipe of a specified outer diameter inserted therein, the improvement in the other of said opposite end portions and comprising, an adapter gasket sized for and mounted within said body and including means for encircling the outside surface of a metallic pipe inserted into said other end portion and having an outer diameter different than said specified outer diameter, a substantially non-metallic squeezing mechanism including means connectable with said body and for compressing said gasket to seal within said passage between the inside of said body and outside surface of the metallic pipe, a non-metallic wedge surface in said squeezing mechanism, and a metallic gripper including means for engagement by said wedge surface for gripping against the outside of the metallic pipe independently of the compression of said adapter gasket.

2. A coupling as defined by claim 1 wherein said metallic gripper comprises first and second wedge segments, each of said segments including a thicker inner end, a thinner outer end, an outer wedge surface and an inner surface extending between said inner and outer ends in a direction generally parallel to said central axis of said body, said inner surface being curved originally to conform generally to the curvature of the outside of the metallic pipe and including a portion thereof having a radius of curvature smaller or equal to the radius of curvature of said specified diameter of the metallic pipe.

3. A coupling as defined by claim 2 wherein said squeezing mechanism includes a non-metallic nut having an inner wedge wall for abutting engagement with said outer wedge surfaces of said first and second wedge segments, said wedge wall being of a generally frusto-conical configuration formed at a preselected angle with respect to an axis of rotation coincident with said central axis, said outer wedge surfaces of said first and second wedge segments being curved generally complementary to said wedge wall, each of said outer wedge surfaces having first and second longitudinal edges spaced circumferentially from each other and extending between said thicker and thinner ends of said segments, and each said longitudinal edge being spaced radially inwardly of said wedge wall so that during tightening of said nut on said coupling body said edges avoid embedding in said non-metallic nut and allow said nut to be rotated relative to said segments.

4. A coupling as defined by claim 3 wherein said inner surface of each of said segments includes an arcuate ridge extending circumferentially relative to said axis and projecting radially inward to an innermost edge for gripping engagement with the outer surface of the metallic pipe, the radius of curvature of said ridge at said innermost edge being less than the radius of curvature of said specified diameter of the metallic pipe.

5. A coupling as defined by claim 4 wherein said inner surface includes a recess formed therein between said ridge and said thicker end of said segment, said recess having a bottom wall with a radius of curvature larger than the radius of curvature of said specified diameter of the metallic pipe.

6. A coupling as defined by claim 5 wherein said inner surface includes a bevelled surface extending in a generally radially outward direction upon progressing from said innermost edge to the said thinner outer end of said segment.

7. A coupling as defined by claim 2 wherein said first and second wedge segments each extend around said metallic pipe for less than of half the circumference thereof with the cumulative circumferential length of said inner surfaces of said wedge segments being less than the circumference of said metallic pipe, and said coupling further includes a resiliently expandable and contractible connector means for holding said first and second segments yieldably together and functioning so that as said metallic pipe is inserted into said coupling said segments are forced away from each other by said metallic pipe and are resiliently held against the outside of said metallic pipe by said connector means.

8. A coupling as defined by claim 7 including a circumferentially extending groove formed in said outer wedge surface of each of said segments, said connector means being a spring ring encircling both of said first and second segments and seated within said grooves to hold said segments together.

9. A coupling as defined by claim 8 wherein said adapter gasket includes a stop protruding radially into said passage for engagement by the metallic pipe.

10. In a coupling having a tubular body with opposite end portions and a flow passage extending therebetween along a central axis of said body with one of said end portions being adapted for gripping connection to and independent compressive sealing against the outside of a non-metallic pipe of a specified outer diameter inserted therein, the improvement in the other of said opposite end portions and comprising, an adapter gasket sized for and mounted within said body for encircling the outside surface of a metallic pipe inserted into said other end portion and having an outer diameter different than said specified outer diameter, a substantially non-metallic squeezing mechanism connectable with said body for compressing said gasket to seal within said passage between the inside of said body and outside surface of the metallic pipe, a metallic gripper engageable by said squeezing mechanism for gripping against the outside of the metallic pipe independently of the compression of said adapter gasket, said metallic gripper comprising first and second wedge segments, each of said segments including a thicker inner end, a thinner outer end, an outer wedge surface and an inner surface extending between said inner and outer ends in a direction generally parallel to said central axis of said body, said inner surface being curved to conform generally to the curvature of the outside of the metallic pipe and including a portion thereof having a radius of curvature smaller than or equal to the radius of curvature of said specified diameter of the metallic pipe, and said squeezing mechanism including a non-metallic nut having an inner wedge wall for abutting engagement with said outer wedge surfaces of said first and second wedge segments, said wedge wall being of a generally frusto-conical configuration formed at a preselected angle with respect to a set axis of rotation extending generally coincident with said central axis, said outer wedge surfaces of said first and second wedge segments being curved generally complementary to said wedge wall and being formed relative to first and second axes of rotation, respectively, said first axis of rotation being offset in a first direction extending away from said set axis of rotation and toward said first segment and said second axis of rotation being offset in a second direction extending away from said set axis of rotation generally diametrical to said first axis of rotation.

11. A transition coupling for connecting a non-metallic pipe to a metallic pipe, said coupling including in combination, a tubular body with opposite ends and a central passage extending therebetween, a first end portion of said passage including means for receiving an end section of the non-metallic pipe and an opposite second end portion of said passage including means for receiving an end section of the metallic pipe, first and second sealing surfaces respectively located within said body in said first and second end portions of said passage, first and second gaskets within said passage adjacent said first and second sealing surfaces, respectively, and including means for sealing engagement between the outside surfaces of the end sections of said non-metallic and metallic pipes and said first and second sealing surfaces, a first gripper associated within said first end portion of said passage and including an external wedge surface and an internal biting surface including means for said gripper to be wedged against the outside of the non-metallic pipe to grip the non-metallic pipe against being pulled from said passage, a second metallic gripper associated with said second end portion of said passage and including an outer wedge surface and an inside biting surface including means for said metallic gripper to be wedged against the outside of the metallic pipe to grip the metallic pipe from being pulled from said passage, and non-metallic means connectable with said body for compressing said gaskets to seal between the inside of said passage and said pipes and for wedging said grippers against the outside of said pipes independently of said gasket compression.

12. A coupling having a tubular body with opposite end portions and a flow passage extending therebetween along a central axis with one of said end portions including means adapted for sealing connection to a non-metallic pipe and the other of said opposite end portions including means adapted for connection to a metallic pipe of predetermined hardness and selected outer surface diameter including, a gasket mounted within said body including means for encircling the outside surface of the metallic pipe when inserted into said other end portion, a squeezing mechanism including means connectable with said body for compressing said gasket to seal within said passage between the inside of said body and outside surface of the metallic pipe, said squeezing mechanism including an inner wedge wall of a generally frustoconical configuration formed at a preselected angle with respect to an axis of rotation coincident with said central axis, and a gripper including means comprised of a material having a hardness not less than said predetermined hardness and being wedged by said squeezing mechanism for gripping against the outside of the metallic pipe independently of the compression of said gasket, said gripper comprising first and second wedge segments, each of said segments including a thicker inner end, a thinner outer end, an outer wedge surface and an inner surface extending between said inner and outer ends, said outer wedge surfaces of said first and second wedge segments being originally curved generally complementary to first and second longitudinal edges spaced circumferentially from each other and extending between said inner and outer ends of said segments, each said longitudinal edge being spaced radially inwardly of said wedge wall, and said inner surface being curved to conform generally to the curvature of the outside of the metallic pipe and including an innermost edge means for gripping engagement with the outer surface of the metallic pipe, said innermost edge means originally having a radius of curvature equal to or less than the radius of curvature of said selected diameter of the metallic pipe.

13. A transition coupling for connecting a non-metallic pipe to a metallic pipe, said coupling including in combination, a tubular body with opposite ends and a central passage extending therebetween, a first end portion of said passage including means for receiving an end section of the non-metallic pipe and an opposite second end portion of said passage including means for receiving an end section of the metallic pipe, a first threaded surface formed in said body adjacent said first end portion of said passage, a second threaded surface formed in said body adjacent said second end portion of said passage, first and second sealing surfaces respectively located within said body in said first and second end portions of said passage, first and second gaskets within said passage adjacent said first and second sealing surfaces, respectively, and including means for sealing engagement between the outside surfaces of the end sections of said non-metallic and metallic pipes and said first and second sealing surfaces, first and second compression members respectively disposed in said passage within said first and second end portions thereof between said first and second gaskets and the adjacent one of said opposite ends of said body, a first gripper associated with said first end portion of said passage and including an external wedge surface and an internal biting surface including means for said first gripper to be wedged against the outside of the non-metallic pipe to grip the non-metallic pipe against being pulled from said passage, a second gripper associated with said second end portion of said passage and including an outer wedge surface and an inside metallic biting surface including means for said second gripper to be wedged against the outside of the metallic pipe to grip the metallic pipe from being pulled from said passage, and first and second non-metallic nuts threadably connected to said first and second threaded sections of said body, respectively, said first and second nuts including respectively, first and second abutment ends including means for acting against said first an second compression members when tightened on said body to press said first and second gaskets into sealing contact with said first and second sealing surfaces, and first and second wedge wall sections, said first wedge wall section including means for wedging against said external wedge surface of said first gripper when said first nut is tightened on said body to cause said first gripper to grip the non-metallic pipe and said second wedge wall section of said second nut including means for wedging against said outside surface of said second gripper when said second nut is tightened on said body to cause said metallic biting surface to grip the metallic pipe.

14. A transition coupling for connecting a non-metallic pipe to a metallic pipe, said coupling including in combination,

- a tubular body with opposite end portions having threaded surfaces, a central passage connected between said opposite end portions, a stop formed internally within said body and extending into said passage for locating the ends of the non-metallic and metallic pipes within said body when inserted into said end portions, and a sealing surface within said body in each of said end portions located axially outwardly of said stop and being exposed to said passage,
- a gasket within said passage adjacent each of said sealing surfaces for sealing engagement between the pipes and said sealing surfaces,
- a compression member disposed within said passage in each of said end portions between each of said gaskets and the adjacent end of said body,
- a non-metallic gripper inserted within one of said opposite end portions for receiving the end of the non-metallic pipe and including an external wedge surface and an internal biting surface for said gripper to be wedged within said body against the outside of the non-metallic pipe to grip the non-metallic pipe against being pulled from said passage,
- a metallic gripper inserted within the other one of said opposite end portions for receiving the end of the metallic pipe and including an outer wedge surface and an inside biting surface for said metallic gripper to be wedged within said body against the outside of the metallic pipe to grip the metallic pipe from being pulled from said passage, and
- a non-metallic nut for each of said opposite end portions, each of said nuts including a threaded section adapted to mate with said threaded surface of one of said end portions, an abutment end for acting against said compression member as said nut is tightened on said body to press said gasket into sealing contact with said sealing surface, and a wedge wall section, said wedge wall section of the one of said nuts adjacent said non-metallic gripper wedging against said external wedge surface when said nut is tightened on said body to cause said non-metallic gripper to grip the non-metallic pipe and said wedge wall section of the other of said nuts adjacent said metallic gripper including means for wedging against said outer wedge surface when said other nut is tightened on said body to cause said metallic gripper to grip the metallic pipe.

15. A transition coupling for connecting a non-metallic pipe of a selected diameter to a metallic pipe of a specified diameter different than said selected diameter, said coupling including in combination,

- a tubular body with opposite ends and a central flow passage extending therebetween along a central axis of said body, a first end portion of said passage for receiving an end section of the non-metallic pipe and an opposite second end portion of said passage for receiving an end section of the metallic pipe, a first threaded surface formed in said body adjacent said first end portion of said passage, a second threaded surface formed in said body adjacent said second end portion of said passage, first and second sealing surfaces respectively located within said body in said first and second end portions of said passage,
- stop means located within said body and extending into said passage for locating the ends of the non-metallic and metallic pipes within said body when inserted into said end portions,
- a first gasket within said passage adjacent said first sealing surface,
- a second adapter gasket within said passage adjacent said second sealing surface,
- said first and second gaskets sealing between the outside surfaces of the end sections of said non-metallic and metallic pipes and said first and second sealing surfaces, respectively,
- said stop means including
    - a first stop integrally formed with said body and projecting radially inward therefrom into said passage intermediate the opposite ends of said body and a second stop integrally formed with said second adapter gasket and projecting radially inwardly therefrom into said passage, said first stop being engageable on one side thereof to position said non-metallic pipe axially when inserted into said body and said first stop being engaged on the opposite side thereof by said second gasket to locate said second gasket and in turn said second stop axially within said body so as to position said metallic pipe axially within said body when inserted into said body and engaging said second stop,
- first and second compression members respectively disposed in said passage within said first and second end portions thereof between said first and second gaskets and the adjacent one of said opposite ends of said body,
- a non-metallic gripper associated with said first end portion of said passage and including an external wedge surface and an internal biting surface for said first gripper to be wedged against the outside of the non-metallic pipe to grip the non-metallic pipe against being pulled from said passage,
- a metallic gripper associated with said opposite end portion of said passage and including first and second wedge segments, each of said segments including a thicker inner end, a thinner outer end, outside wedge and inner biting surfaces extending between said thicker and thinner ends generally axially relative to said body,
- said inner surface being curved to conform generally to the curvature of the outside of the metallic pipe and including,
    - an arcuate ridge located between said thicker and thinner ends of said segment,
    - a recess formed in said inner surface between said ridge and said thicker end of said segment, and
    - a bevelled surface extending between said ridge and said thinner end of said segment,
    - said ridge extending circumferentially relative to said axis and projecting radially inward to an innermost edge for embedding gripping engagement with the outer surface of the metallic pipe, the radius of curvature of said ridge at said innermost edge being less than the radius of curvature of said specified diameter of the metallic pipe, said recess having a bottom wall with a radius of curvature larger than the radius of curvature of said specified diameter, and said bevelled surface extending in a generally radially outward direction upon progressing from said innermost edge to the said thinner outer end of said segment, said first and second wedge segments together substantially encircling said metallic pipe with each said segment extending around said metallic pipe for less than of half the circumference thereof, a circumferentially extending groove formed in the wedge surface of each of said segments, a connector ring encircling both of said first and second segments and seated within said grooves to hold said segments yieldably together so that as said metallic pipe is inserted into said coupling said segments are forced away from each other by said metallic pipe and are resiliently held against the outside of said metallic pipe by said connector, and first and second nuts threadably connected to said first and second threaded sections of said body, respectively, said first and second nuts including respectively, first and second abutment ends for acting against said first and second compression members when tightened on said body to press said first and second gaskets into sealing contact with said first and second sealing surfaces, and first and second wedge wall sections, said first wedge wall section wedging against said external wedge surface of said non-metallic gripper when said first nut is tightened on said body to cause said non-metallic gripper to grip the non-metallic pipe and said second wedge wall section of said second nut wedging against said outside wedge surfaces of said metallic gripper when said second nut is tightened on said body to cause said innermost edges of said ridges of said wedge segments to embed in and to grip the metallic pipe against being pulled out of said body.

16. A connection having a tubular body with opposite end portions and a passage extending therebetween along a central axis, a gasket mounted in one of said end portions including means for encircling the outside surface of a metallic pipe of specified diameter inserted into said one end portion, a squeezing mechanism connectable with said body and including means for compressing said gasket to seal within said passage between the inside of said body and outside surface of the metallic pipe, a metallic gripper including means engageable by said squeezing mechanism for gripping against the outside of the metallic pipe, said metallic gripper comprising first and second wedge segments, each of said segments including a thicker inner end, a thinner outer end, an outer wedge surface and an inner surface extending between said inner and outer ends in a direction generally parallel to said central axis of said to the curvature of the outside of the metallic pipe and including a means portion thereof for extending around a substantial portion of the circumference of said pipe and having an original radius of curvature less than or equal to the radius of curvature of said specified diameter of the metallic pipe prior to gripping engagement with said pipe.

17. A connection as defined by claim 16 wherein said squeezing mechanism includes a nut having an inner wedge wall for abutting engagement with said outer wedge surfaces of said first and second wedge segments, said wedge wall being of a generally frustoconical configuration formed at a preselected angle with respect to an axis of rotation coincident with said central axis, said outer wedge surfaces of said first and second wedge segments being curved generally complementary to said wedge wall, each of said outer wedge surfaces having first and second longitudinal edges spaced circumferentially from each other and extending between said thicker and thinner ends of said segments, and each said longitudinal edge being spaced radially inwardly of said wedge wall so that during tightening of said nut on said coupling body said edges avoid embedding in said nut and allow said nut to be rotated relative to said segments.

18. A connection as defined by claim 17 wherein said inner surface of each of said segments includes an arcuate ridge extending circumferentially relative to said axis and projecting radially inward to an innermost edge for gripping engagement with the outer surface of the metallic pipe, the radius of curvature of said ridge at said innermost edge being less than the radius of curvature of said specified diameter of the metallic pipe.

19. A connection as defined by claim 18 wherein said inner surface includes a recess formed therein between said ridge and said thicker end of said segment, said recess having a bottom wall with a radius of curvature larger than the radius of curvature of said specified diameter of the metallic pipe.

20. A connection as defined by claim 19 wherein said inner surface includes a bevelled surface extending in a generally radially outward direction upon progressing from said innermost edge to the said thinner outer end of said segment.

21. A connection as defined by claim 20 wherein said first and second wedge segments each extend around said metallic pipe for less than of half the circumference thereof and said coupling further includes a resiliently expandable and contractible connector holding said first and second segments yieldably together so that as said metallic pipe is inserted into said coupling said segments are forced away from each other by said metallic pipe and are resiliently held against the outside of said metallic pipe by said connector.

22. A connection as defined by claim 21 including a circumferentially extending groove formed in said outer wedge surface of each of said segments, said connector being a spring ring encircling both of said first and second segments and seated within said grooves to hold said segments together.

23. A connection having a tubular body with opposite end portions and a passage extending therebetween along a central axis, a gasket mounted in one of said end portions for encircling the outside surface of the metallic pipe of specified diameter inserted into said one end portion, a squeezing mechanism connectable with said body for compressing said gasket to seal within said passage between the inside of said body and outside surface of the metallic pipe, said metallic gripper comprising first and second wedge segments, each of said segments including a thicker inner end, a thinner outer end, an outer wedge surface and an inner surface extending between said inner and outer ends in a direction generally parallel to said central axis of said body, said inner surface being curved to conform generally to the curvature of the outside of the metallic pipe and including an portion thereof having a radius of curvature less than or equal to the radius of curvature of said specified diameter of the metallic pipe.

24. A sealing connection for a metallic pipe of predetermined hardness, said connection having a body with a passage extending along an axis from one end portion to another, said one end portion being adapted for sealing connection to said metallic pipe and including a gasket mounted within said body for encircling the outside surface of the metallic pipe when inserted into said one end portion, a squeezing mechanism connectable with said body for compressing said gasket to seal within said passage between the inside of said body and outside surface of the metallic pipe having a specific diameter, said squeezing mechanism including an inner wedge wall of a generally frustoconical configuration formed at a preselected angle with respect to an axis of rotation coincident with said central axis, and a gripper comprised of a material having a hardness greater than or equal to said predetermined hardness and being wedged by said squeezing mechanism for gripping against the outside of the metallic pipe, said gripper comprising first and second wedge segments, each of said segments including a thicker inner end, a thinner outer end, an outer wedge surface and an inner surface extending between said inner and outer ends, said outer wedge surfaces of said first and second wedge segments being curved generally complementary to said wedge wall, each of said outer wedge surfaces having first and second longitudinal edges spaced circumferentially from each other and extending between said inner and outer ends of said segments, each said longitudinal edge being spaced radially inwardly of said wedge wall, and said inner surface being curved originally to conform generally to the curvature of the outside of the metallic pipe and including an innermost edge for gripping engagement with the outer surface of the metallic pipe, said innermost edge having an original radius of curvature equal to or less than the radius of curvature of said specified diameter of the metallic pipe.

* * * * *